(12) United States Patent
Chen

(10) Patent No.: US 12,306,650 B2
(45) Date of Patent: May 20, 2025

(54) DIGITAL LOW-DROPOUT REGULATOR WITH VARIABLE COMPENSATION GAIN AND CONTROL METHOD THEREOF

(71) Applicant: Realtek Semiconductor Corp., HsinChu (TW)

(72) Inventor: Shih-Chang Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 288 days.

(21) Appl. No.: 17/993,904

(22) Filed: Nov. 24, 2022

(65) Prior Publication Data

US 2023/0168702 A1  Jun. 1, 2023

(30) Foreign Application Priority Data

Nov. 26, 2021  (TW) .................................. 110144121

(51) Int. Cl.
| | |
|---|---|
| G05F 1/56 | (2006.01) |
| G05F 1/565 | (2006.01) |
| G05F 1/575 | (2006.01) |
| H02M 1/00 | (2006.01) |
| H02M 3/157 | (2006.01) |

(52) U.S. Cl.
CPC .............. G05F 1/565 (2013.01); G05F 1/575 (2013.01); H02M 1/0012 (2021.05); H02M 3/157 (2013.01)

(58) Field of Classification Search
CPC ...... G05F 1/565; G05F 1/575; H02M 1/0012; H02M 3/157
See application file for complete search history.

(56) References Cited

U.S. PATENT DOCUMENTS

| | | | |
|---|---|---|---|
| 2016/0282889 A1* | 9/2016 | Mahajan | G05F 1/575 |
| 2018/0224875 A1* | 8/2018 | Ham | G05F 1/466 |
| 2018/0292851 A1* | 10/2018 | Mahajan | H02M 1/0045 |
| 2020/0036287 A1* | 1/2020 | Peretz | H03F 3/2171 |

FOREIGN PATENT DOCUMENTS

| | | |
|---|---|---|
| CN | 104793681 A | 7/2015 |
| CN | 106647915 A | 5/2017 |

* cited by examiner

*Primary Examiner* — Jue Zhang
*Assistant Examiner* — Lakaisha Jackson
(74) *Attorney, Agent, or Firm* — Winston Hsu

(57) ABSTRACT

A digital low-dropout regulator (DLDO) and a control method thereof are provided. The DLDO includes a power switch circuit, an error detector and a control circuit, wherein the control circuit is coupled to the power switch circuit and the error detector. The power switch circuit is configured to receive an input voltage to generate an output voltage, wherein a voltage difference between the input voltage and the output voltage is controlled by a switch control code. The error detector is configured to generate an error code according to an error between the output voltage and a target voltage. The control circuit is configured to determine a compensation amount according to the switch control code and the error code, and update the switch control code according to the compensation amount, in order to make the output voltage approach the target voltage.

10 Claims, 5 Drawing Sheets

DIGITAL LOW-DROPOUT REGULATOR WITH VARIABLE COMPENSATION GAIN AND CONTROL METHOD THEREOF

BACKGROUND OF THE INVENTION

1. Field of the Invention

The present invention is related to voltage control, and more particularly, to a digital low-dropout (DLDO) regulator and a control method thereof.

2. Description of the Prior Art

When a central processing unit (CPU) operates in a busy status, a great amount of current may be drawn from a power supply. By comparison, when the CPU operates in an idle status, the current provided by the power supply may be reduced. In order to make an overall system operate stably, a loop system may be built in the CPU to dynamically modify the circuit configuration in response to the supply condition of the current. In some related arts, the circuit configuration modification is performed based on a fixed compensation gain. The setting of the compensation gain may have a trade-off between stability and speed of the system, however. For example, a greater compensation gain is more likely to result in oscillation of the system, and a smaller compensation gain may slow down the speed of the circuit configuration tracking the change in current load.

Thus, there is a need for a novel architecture and an associated control method that can ensure performance related to both the system stability and the tracking speed without introducing any side effect or in a way that is less likely to introduce side effects, to thereby improve an overall performance.

SUMMARY OF THE INVENTION

An objective of the present invention is to provide a digital low-dropout (DLDO) regulator and a control method thereof, that can provide corresponding compensation gains in response to operating conditions of various types of loading, thereby ensuring the performance related to both the system stability and the tracking speed.

At least one embodiment of the present invention provides a DLDO regulator. The DLDO regulator comprises a power switch circuit, an error detector and a control circuit, wherein the control circuit is coupled to the power switch circuit and the error detector. The power switch circuit is configured to receive an input voltage to generate an output voltage, wherein a voltage difference between the output voltage and the input voltage is controlled by a switch control code. The error detector is configured to generate an error code according to an error between the output voltage and a target voltage. The control circuit is configured to determine a compensation amount according to the switch control code and the error code, and update the switch control code according to the compensation amount, in order to make the output voltage approach the target voltage.

At least one embodiment of the present invention provides a control method of a DLDO regulator. The control method comprises: utilizing a power switch circuit of the DLDO regulator to receive an input voltage to generate an output voltage, wherein a voltage difference between the output voltage and the input voltage is controlled by a switch control code; utilizing an error detector of the DLDO regulator to generate an error code according to an error between the output voltage and a target voltage; and utilizing a control circuit of the DLDO regulator to determine a compensation amount according to the switch control code and the error code, and update the switch control code according to the compensation amount, in order to make the output voltage approach the target voltage.

The DLDO regulator and the control method thereof of the present invention can determine the compensation amount according to the switch control code and the error code. As the switch control code may change in response to the change of the supply current, the effective compensation gain of the present invention can change in response to a different supply current, thereby ensuring the performance related to both the system stability and the tracking speed. Furthermore, the embodiment of the present invention will not greatly increase additional costs. Thus, the present invention can ensure performance related to both the system stability and the tracking speed and thereby improve the overall performance without introducing any side effect or in a way that is less likely introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
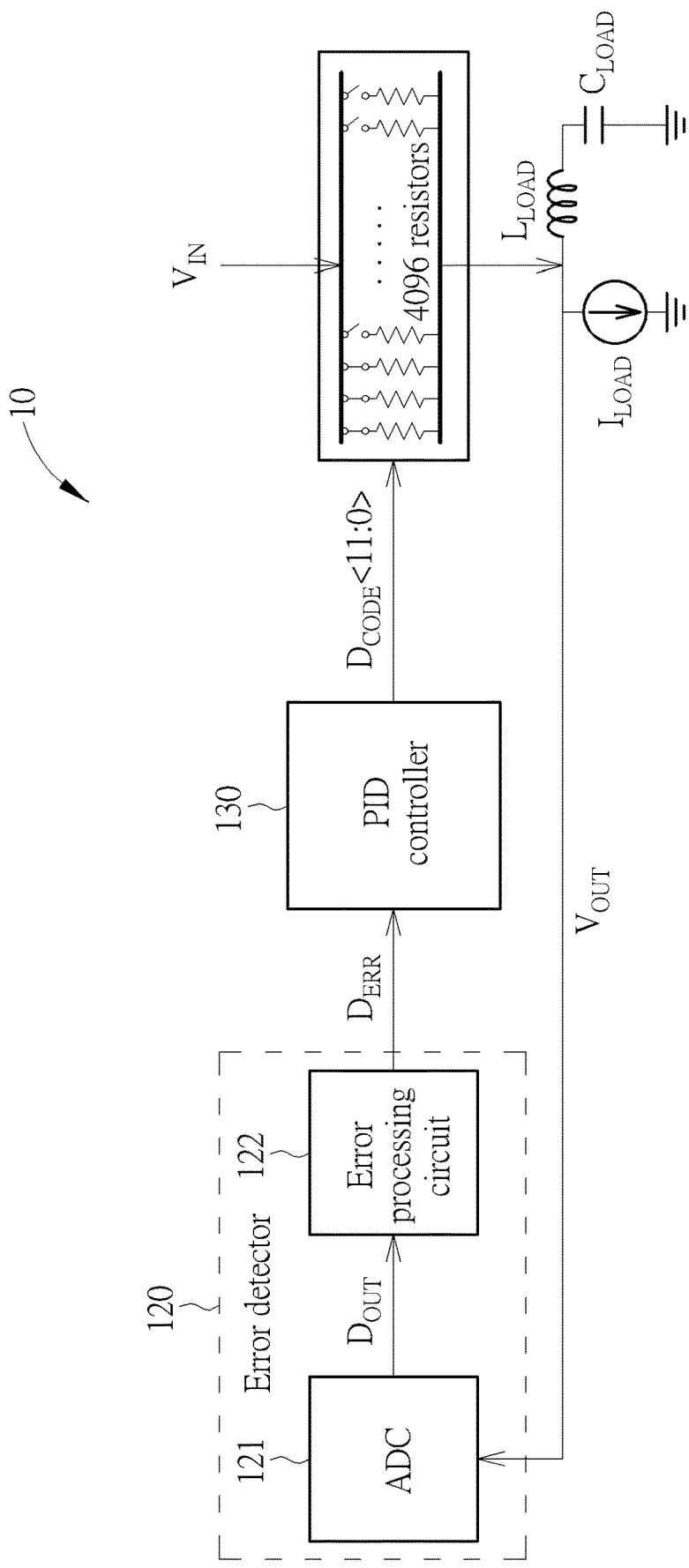
FIG. 1 is a diagram illustrating a digital low-dropout (DLDO) regulator according to an embodiment of the present invention.

FIG. 1 is a diagram illustrating a digital low-dropout (DLDO) regulator 10 according to an embodiment of the present invention, where the DLDO regulator 10 may receive an input voltage $V_{IN}$ from an external source and accordingly provide an output voltage $V_{OUT}$ to one or more sub-circuits within an electronic device (e.g., a central processing unit) to be a supply voltage. In this embodiment, the DLDO regulator 10 comprises a power switch circuit 110, an error detector 120 and a control circuit such as a proportional-integral-derivative (PID) controller 130, where the PID controller 130 is coupled to the power switch circuit 110 and the error detector 120. In this embodiment, an equivalent circuit of an output load of the DLDO regulator 10 comprises components such as an inductor $L_{LOAD}$ and a capacitor $C_{LOAD}$, but the present invention is not limited thereto. The power switch circuit 110 is configured to receive the input voltage $V_{IN}$ to generate the output voltage $V_{OUT}$, where a voltage difference $\Delta V$ between the input voltage $V_{IN}$ and the output voltage $V_{OUT}$ is controlled by a switch control code $D_{CODE}$. More particularly, the power switch circuit 110 comprises multiple current supply paths connected in parallel, and the switch control code $D_{CODE}$ is utilized to control a number of enabled current supply paths among the multiple current supply paths (e.g., control the number of enabled current supply paths among 4096 current supply paths using a 12-bit switch control code $D_{CODE}$<11: 0>). For better comprehension, assume that a decimal value of the switch control code $D_{CODE}$ represents the number of enabled current supply paths among the multiple current supply paths. In addition, each of the multiple current supply paths may be regarded as being constituted by a resistor (e.g., an inherent resistor on a signal path) and a switch. Assuming that a resistance of each resistor is R and a load current flowing through the power switch circuit 110 is $I_{LOAD}$, an equivalent resistance $R_{EFF}$ between the input voltage $V_{IN}$ and the output voltage $V_{OUT}$, and the voltage difference $\Delta V$ between the input voltage $V_{IN}$ and the output voltage $V_{OUT}$, can be expressed as follows:

$$R_{EFF} = \frac{R}{D_{CODE}}; \text{ and}$$

$$\Delta V = \frac{I_{LOAD} \times R}{D_{CODE}};$$

but the present invention is not limited thereto.

The error detector 120 is configured to generate an error code $D_{ERR}$ according to an error between the output voltage $V_{OUT}$ and a target voltage. In this embodiment, the error detector 120 comprises an analog-to-digital converter (ADC) 121 and an error processing circuit 122. The ADC 121 is configured to convert the output voltage $V_{OUT}$ into an output voltage code $D_{OUT}$ (e.g., covert the output voltage $V_{OUT}$ which is in analogue form into the output voltage code $D_{OUT}$ which is in digital form), and the error processing circuit 122 is configured to calculate a difference between the output voltage code $D_{OUT}$ and a target voltage code to be an error code $D_{ERR}$, where the target voltage code corresponds to the target voltage (e.g. the target voltage may be converted into a digitalized value of the target voltage to be the target voltage code). In this embodiment, the ADC 121 may be regarded as a fast speed sensor (FSS) ADC. For example, when the ADC 121 detects that the output voltage $V_{OUT}$ drops (which results in the operations of some sub-circuits slowing down), it can be detected that the electronic device (e.g. the central processing unit) is operating in a busy status at this moment, and in order to provide sufficient current, the number of enabled current supply paths may need to be increased. In contrast, when the ADC 121 detects that the output voltage $V_{OUT}$ rises (which results in operations of some sub-circuits getting faster), it can be detected that the electronic device (e.g. the central processing unit) is operating in an idle status at this moment, and the number of enabled current supply paths may be reduced.

Figure 2:
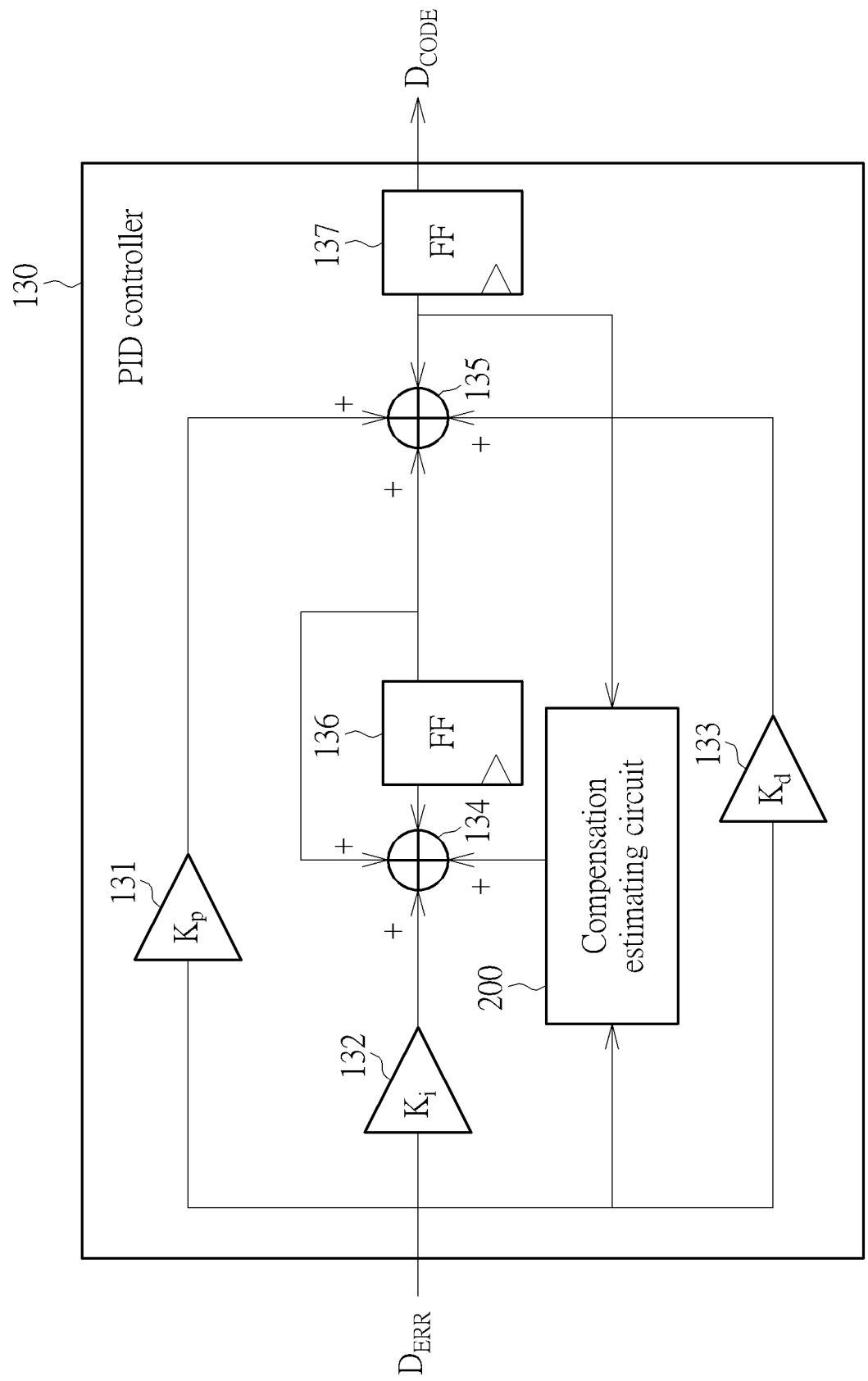
FIG. 2 is a diagram illustrating details of a proportional-integral-derivative (PID) controller according to an embodiment of the present invention.

The PID controller 130 is configured to generate the switch control code $D_{CODE}$ at least according to the error code $D_{ERR}$, and more particularly, determines a compensation amount according to the switch control code $D_{CODE}$ and the error code $D_{ERR}$. In addition, the PID controller 130 updates the switch control code $D_{CODE}$ according to the compensation amount, in order to make the output voltage \T$_{OUT}$ approach the target voltage. FIG. 2 is a diagram illustrating some details of the PID controller 130 according to an embodiment of the present invention, where the PID controller 130 comprises a proportional-term operating unit 131, an integral-term operating unit 132, a derivative-term operating unit 133, adders 134 and 135, flip-flops 136 and 137 (labeled "FF" in FIG. 2 for brevity), and a compensation estimating circuit 200. In this embodiment, the proportional-term operating unit 131, the integral-term operating unit 132 and the derivative-term operating unit 133 respectively apply a proportional gain $K_p$, an integral gain $K_i$ and a derivative gain $K_d$ on the error code $D_{ERR}$, to be used in subsequent processing. In detail, the integral-term operating unit 132, the adder 134 and the flip-flop 136 constitute an integer having the integral gain $K_i$, for performing an integral operation on the error code $D_{ERR}$. For example, the adder 134 sums a multiplication result (which is generated by multiplying the error code $D_{EI}$ by the integral gain $K_i$) and the output of the flip-flop 136 (e.g. a previous accumulation result generated in a previous cycle of an operation clock) in order to generate a current accumulation result, and the flip-flop 136 outputs the current accumulation result mentioned above in a next cycle of the operation clock. In addition, the adder 135 sums the output of the proportional-term operating unit 131, the output of the flip-flop 136 and the output of the derivative-term operating unit 133 to generate the switch control code $D_{CODE}$, and outputs the switch control code $D_{CODE}$ to the power switch circuit 110 via the flip-flop 137. It should be noted that the function of the integral operation mentioned above is to eliminate a steady state error, where the integral gain $K_i$ would be the key point of whether the overall system is stable or not. Under a condition where the integral gain $K_i$ is fixed and the compensation estimating circuit 200 is disabled, the design of the integral gain $K_i$ may have trade-off between system stability and tracking speed regarding the target voltage. In order to ensure the performance related to both the system stability and the tracking speed, the present invention can achieve an effect that is similar to dynamically modifying the integral gain $K_i$ in response to the change of the load current $I_{LOAD}$.

Figure 3:
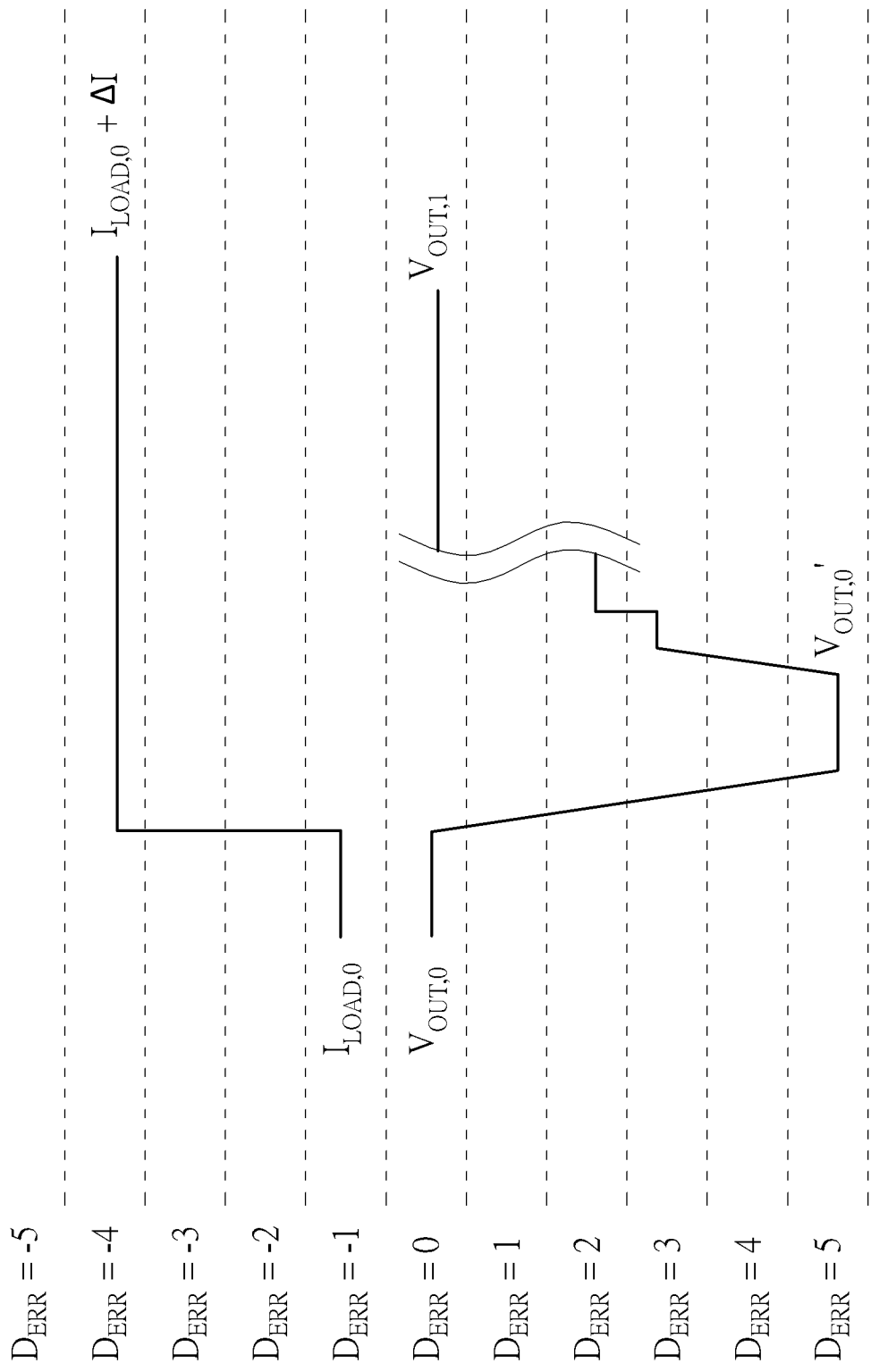
FIG. 3 is a diagram illustrating a change in output voltage in response to a change in load current according to an embodiment of the present invention

For better comprehension, refer to FIG. 3. FIG. 3 is a diagram illustrating a change in output voltage $V_{OUT}$ in response to a change in load current $I_{LOAD}$ according to an embodiment of the present invention. Assume that the load current $I_{LOAD}$ is $I_{LOAD,0}$ and the voltage level of the output voltage $V_{OUT}$ is $V_{OUT,0}$ at the beginning. At this moment, $D_{ERR}=0$ (which means the voltage difference between the output voltage $V_{OUT}$ and the target voltage is less than a resolution m of the error detector 120), and the value of the switch control code $D_{CODE}$ is $D_{CODE,0}$. When the load current $I_{LOAD}$ suddenly increases by $\Delta I$ (e.g. $I_{LOAD}=I_{LOAD,0}+\Delta I$), as the value of the switch control code $D_{CODE}$ is not updated yet (e.g. maintained at $D_{CODE,0}$), the voltage level of the output voltage $V_{OUT}$ changes from $V_{OUT,0}$ to $V_{OUT,0}'$ as follows:

$$V_{OUT,0'} = V_{IN} - \frac{(I_{LOAD,0} + \Delta I) \times R}{D_{CODE,0}} =$$

$$V_{IN} - \frac{I_{LOAD,0} \times R}{D_{CODE,0}} - \frac{\Delta I \times R}{D_{CODE,0}} = V_{OUT,0} - \frac{\Delta I \times R}{D_{CODE,0}};$$

$$\Rightarrow V_{OUT,0} - V_{OUT,0'} = \frac{\Delta I \times R}{D_{CODE,0}}.$$

When the voltage drop of the output voltage $V_{OUT}$ caused by the change in load current $I_{LOAD}$ is represented by E, a relationship between the change amount $\Delta I$ of the load current $I_{LOAD}$ and the voltage drop E may be expressed as follows:

$$E = V_{OUT,0} - V_{OUT,0'} = \frac{\Delta I \times R}{D_{CODE,0}};$$

$$\Rightarrow \Delta I = \frac{E \times D_{CODE,0}}{R}.$$

Assuming that the voltage level of the output voltage $V_{OUT}$ can be compensated to $V_{OUT,1}$ (which makes the error code $D_{ERR}$ return to 0) by modifying the value of the switch control code $D_{CODE}$ to $D_{CODE,1}$, the voltage level $V_{OUT,1}$ of the output voltage $V_{OUT}$ under a condition where the value of the switch control code $D_{CODE}$ is $D_{CODE,1}$ may be expressed as follows:

$$V_{OUT,1} = V_{IN} - \frac{(I_{LOAD,0} + \Delta I) \times R}{D_{CODE,1}} = V_{IN} - \frac{I_{LOAD,0} \times R}{D_{CODE,1}} - \frac{E \times D_{CODE,0}}{R} \times \frac{R}{D_{CODE,1}}.$$

Assuming that the voltage difference $\Delta V$ between the input voltage $V_{IN}$ and the target voltage is $V_{DIFF}$, a relationship between the value $D_{CODE,0}$ of the switch control code DCODE before compensation and the value $D_{CODE,1}$ of the switch control code $D_{CODE}$ after compensation may be expressed as follows:

$$V_{DIFF} = V_{IN} - V_{OUT,1} = \frac{I_{LOAD,0} \times R}{D_{CODE,1}} + \frac{E \times D_{CODE,0}}{D_{CODE,1}};$$

$$\Rightarrow D_{CODE,1} = \frac{I_{LOAD,0} \times R}{V_{DIFF}} + \frac{E \times D_{CODE,0}}{V_{DIFF}} = D_{CODE,0} + \frac{E \times D_{CODE,0}}{V_{DIFF}}.$$

According to the above derivation, the present invention can improve the speed of the switch control code $D_{CODE}$ converging to the target value $D_{CODE,1}$ via compensating the integral operations. As the resolution of the error detector 120 is m, the voltage drop $E = m \times D_{ERR}$, and the compensation amount of the switch control code $D_{CODE}$ may be expressed as follows:

$$D_{CODE,1} - D_{CODE,0} =$$

$$\frac{E \times D_{CODE,0}}{V_{DIFF}} = \frac{m}{V_{DIFF}} \times D_{ERR} \times D_{CODE,0} = K \times D_{ERR} \times D_{CODE,0}.$$

According to the above derivation, the compensation amount of the switch control code $D_{CODE}$ can be obtained according to a product of the value $D_{CODE,0}$ of the switch control code $D_{CODE}$ before compensation, the error code $D_{ERR}$ and a predetermined coefficient K. Thus, as shown in FIG. 2, the PID controller 130 may transmit the product of the output of the adder 135 (i.e. the switch control code $D_{CODE}$), the error code $D_{ERR}$ and the predetermined coefficient K, in order to perform compensation on the integral operations.

The compensation amount of the switch control code $D_{CODE}$ is proportional to a current value of the switch control code $D_{CODE}$ (e.g. $D_{CODE,0}$). When the electronic device operates in a heavy load status, $D_{CODE,0}$ is higher. Under this condition, if the voltage level of the output voltage $V_{OUT}$ drifts away from the voltage level of the target voltage due to the change in load current $I_{LOAD}$, the compensation estimating circuit 200 utilizes a higher compensation amount to compensate the switch control code $D_{CODE}$, in order to make the compensation of the switch control code $D_{CODE}$ converge faster. By comparison, when the electronic device operates in a light load status, $D_{CODE}$ is lower. Under this condition, if the voltage level of the output voltage $V_{OUT}$ drifts away from the voltage level of the target voltage due to the change in load current $I_{LOAD}$, the compensation estimating circuit 200 utilizes a lower compensation amount to compensate the switch control code $D_{CODE}$, in order to avoid oscillation occurring during the converging. Thus, the DLDO regulator 10 of the present invention can ensure the performance related to both the system stability and the tracking speed of the switch control code, and thereby improve the overall performance.

Figure 4:
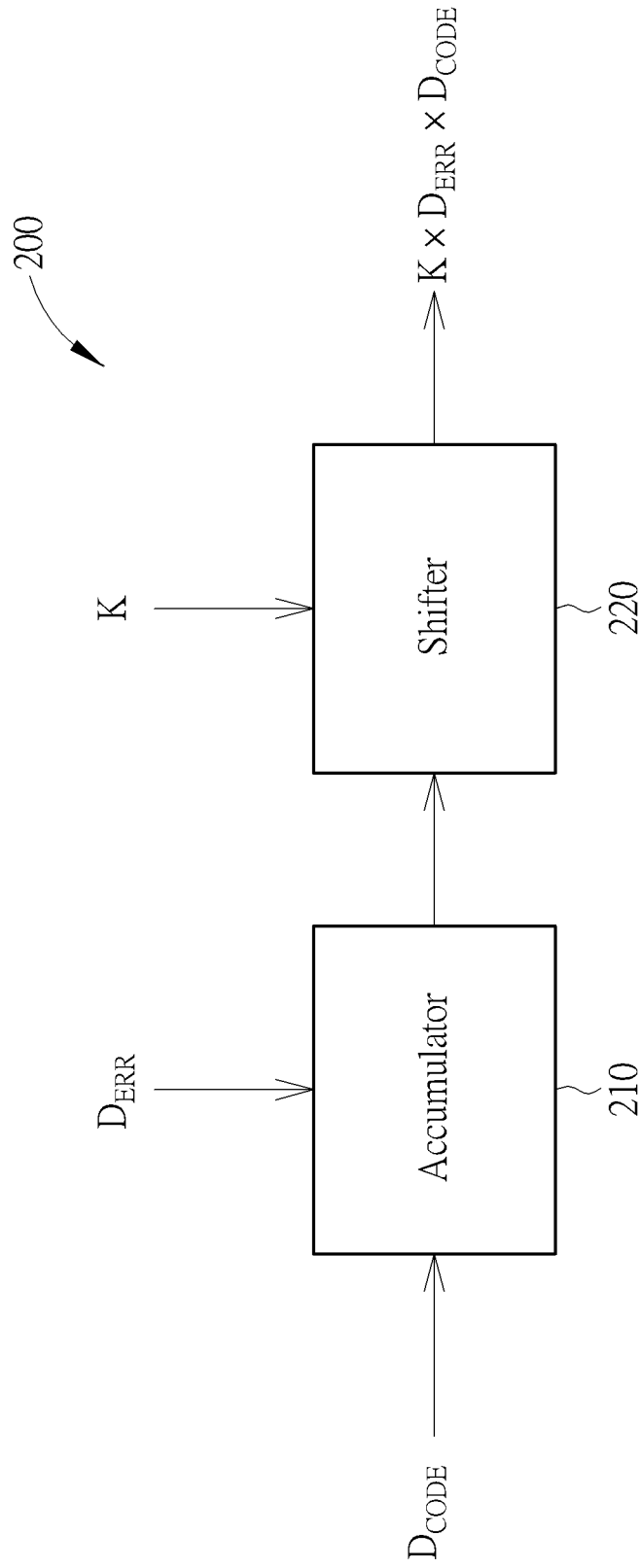
FIG. 4 is a diagram illustrating details of a compensation estimating circuit according to an embodiment of the present invention.

FIG. 4 is a diagram illustrating some details of the compensation estimating circuit 200 according to an embodiment of the present invention. As shown in FIG. 4, the compensation estimating circuit 200 may comprise an accumulator 210, where the accumulator 210 may control the number of times the switch control code $D_{CODE}$ is accumulated according to the error code $D_{ERR}$, in order to obtain $D_{ERR} \times D_{CODE}$. It should be noted that the predetermined coefficient K does not have to be exactly equal to $m/VD_{IFF}$. More particularly, K may be set to be $\frac{1}{2^N}$ in order to simplify the hardware which is configured to calculate $K \times D_{ERR} \times D_{CODE}$, where N is a positive integer. For example, N may be a proper positive integer which makes $\frac{1}{2^N}$ as close to $m/V_{DIFF}$ as possible, where K is preferably slightly less than $m/V_{DIFF}$, and the switch control code $D_{CODE}$ may gradually approach the target value $D_{CODE,1}$ via multiple iterations of compensation operations. For example, assume that m is 20 millivolts (mV) and $V_{DIFF}$ is 100 mV, and K may be set as $\frac{1}{8}$ (i.e., N=3). As the predetermined coefficient K is $\frac{1}{2^N}$, shifting respective bits of a value by N bits to the right in the digital domain (or removing three consecutive bits starting from the least significant bit) can complete the operation of multiplying the value by $\frac{1}{2^N}$. As shown in FIG. 4, the compensation estimating circuit 200 may further comprise a shifter 220 configured to shift a product of the switch control code $D_{CODE}$ and the error code $D_{ERR}$ (i.e., $D_{ERR} \times D_{CODE}$ output from the accumulator 210) by N bits in order to generate the compensation amount $K \times D_{ERR} \times D_{CODE}$ of the switch control code $D_{CODE}$. In some embodiments, the shifter 220 may shift the switch control code $D_{CODE}$ by N bits to generate a product $K \times D_{CODE}$ of the switch control code $D_{CODE}$ and the predetermined coefficient K, and then the accumulator 210 may control the number of times $K \times D_{CODE}$ is accumulated according to the error code $D_{ERR}$ to obtain the compensation amount $K \times D_{ERR} \times D_{CODE}$ of the switch control code $D_{CODE}$. As long as the compensation estimating circuit 200 can output the compensation amount $K \times D_{ERR} \times D_{CODE}$ of the switch control code $D_{CODE}$, the operations of the accumulator 210 and the shifter 220 therein may be modified.

Figure 5:
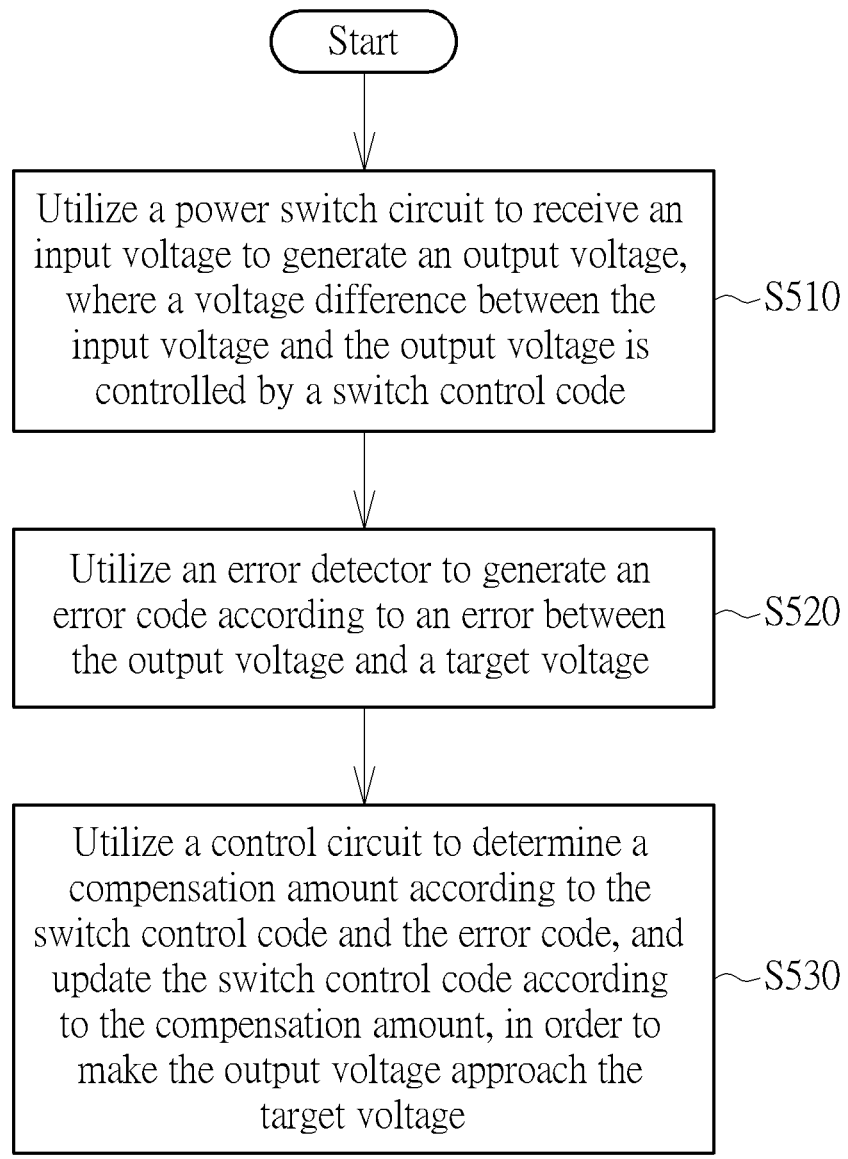
FIG. 5 is a diagram illustrating a working flow of a control method of a DLDO regulator according to an embodiment of the present invention.

FIG. 5 is a diagram illustrating a working flow of a control method of a DLDO regulator (e.g. the DLDO regulator 10 shown in FIG. 1) according to an embodiment of the present invention. It should be noted that the working flow shown in FIG. 5 is for illustrative purposes only, and is not meant to be a limitation of the present invention. More particularly, one or more steps may be added, deleted or modified in the working flow shown in FIG. 5. In addition, if the overall result is not hindered, these steps do not have to be executed in the exact order shown in FIG. 5.

In Step S510, the DLDO utilizes a power switch circuit to receive an input voltage to generate an output voltage, where a voltage difference between the input voltage and the output voltage is controlled by a switch control code.

In Step S520, the DLDO utilizes an error detector to generate an error code according to an error between the output voltage and a target voltage.

In Step S530, the DLDO utilizes a control circuit to determine a compensation amount according to the switch control code and the error code, and updates the switch control code according to the compensation amount in order to make the output voltage approach the target voltage.

To summarize, the DLDO and the control method thereof of the present invention determine a compensation amount according to a switch control code and an error code. As the switch control code may change in response to a change in the supply current, the equivalent compensation gain of the present invention will vary in response to different supply currents, thereby ensuring performance related to both the system stability and the tracking speed. In addition, the embodiments of the present invention will not greatly increase additional costs. Thus, the present invention can ensure performance related to both system stability and tracking speed, and improve the overall performance without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital low-dropout (DLDO) regulator with a variable compensation gain, comprising:
    a power switch circuit, configured to receive an input voltage to generate an output voltage, wherein a voltage difference between the output voltage and the input voltage is controlled by a switch control code;
    an error detector, configured to generate an error code according to an error between the output voltage and a target voltage; and
    a control circuit, coupled to the power switch circuit and the error detector, configured to determine a compensation amount according to the switch control code and the error code, and update the switch control code according to the compensation amount, in order to make the output voltage approach the target voltage;
    wherein the control circuit comprises a compensation estimating circuit, configured to calculate the compensation amount according to a product of the switch control code, the error code and a predetermined coefficient.

2. The DLDO regulator of claim 1, wherein the predetermined coefficient is $(½^N)$, and N is a positive integer.

3. The DLDO regulator of claim 2, wherein the compensation estimating circuit comprises a shifter, configured to shift a product of the switch control code and the error code by N bits, in order to generate the compensation amount.

4. The DLDO regulator of claim 1, wherein the power switch circuit comprises multiple current supply paths connected in parallel, and the switch control code is utilized to control a number of enabled current supply paths among the multiple current supply paths.

5. The DLDO regulator of claim 1, wherein the error detector comprises:
    an analog-to-digital converter (ADC), configured to convert the output voltage into an output voltage code; and
    an error processing circuit, configured to calculate a difference between the output voltage code and a target voltage code to be the error code, wherein the target voltage code corresponds to the target voltage.

6. A control method of a digital low-dropout (DLDO) regulator with a variable compensation gain, comprising:
    utilizing a power switch circuit of the DLDO regulator to receive an input voltage to generate an output voltage, wherein a voltage difference between the output voltage and the input voltage is controlled by a switch control code;
    utilizing an error detector of the DLDO regulator to generate an error code according to an error between the output voltage and a target voltage; and
    utilizing a control circuit of the DLDO regulator to determine a compensation amount according to the switch control code and the error code, and update the switch control code according to the compensation amount, in order to make the output voltage approach the target voltage;
    wherein utilizing the control circuit of the DLDO regulator to determine the compensation amount according to the switch control code and the error code comprises:
        calculating the compensation amount according to a product of the switch control code, the error code and a predetermined coefficient.

7. The control method of claim 6, wherein the predetermined coefficient is $(½^N)$, and N is a positive integer.

8. The control method of claim 7, wherein calculating the compensation amount according to the product of the switch control code, the error code and the predetermined coefficient comprises:
    utilizing a shifter to shift a product of the switch control code and the error code by N bits, in order to generate the compensation amount.

9. The control method of claim 6, wherein the power switch circuit comprises multiple current supply paths connected in parallel, and the switch control code is utilized to control a number of enabled current supply paths among the multiple current supply paths.

10. The control method of claim 6, wherein utilizing the error detector of the DLDO regulator to generate the error code according to the error between the output voltage and the target voltage comprises:
    utilizing an analog-to-digital converter (ADC) of the error detector to convert the output voltage into an output voltage code; and
    utilizing an error processing circuit of the error detector to calculate a difference between the output voltage code and a target voltage code to be the error code, wherein the target voltage code corresponds to the target voltage.

* * * * *